(12) United States Patent
Pehrsson et al.

(10) Patent No.: US 8,503,992 B2
(45) Date of Patent: Aug. 6, 2013

(54) SERVICE AREAS IN CS DOMAIN SERVICES

(75) Inventors: Arne Pehrsson, Huddinge (SE); Magnus Hallenstål, Täby (SE); Göran Rune, Linköping (SE); Jari Vikberg, Järna (SE); Andreas Witzel, Herzogenrath (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 552 days.

(21) Appl. No.: 12/666,036

(22) PCT Filed: Jun. 22, 2007

(86) PCT No.: PCT/EP2007/056278
§ 371 (c)(1),
(2), (4) Date: Feb. 22, 2010

(87) PCT Pub. No.: WO2009/000318
PCT Pub. Date: Dec. 31, 2008

(65) Prior Publication Data
US 2010/0189035 A1    Jul. 29, 2010

(51) Int. Cl.
*H04L 12/66* (2006.01)
*H04W 24/00* (2009.01)

(52) U.S. Cl.
USPC .................. 455/414.1; 370/352; 455/456.1

(58) Field of Classification Search
USPC ....... 455/456.1, 450, 422, 437, 440; 370/328, 370/352
See application file for complete search history.

(56) References Cited

U.S. PATENT DOCUMENTS

| | | | |
|---|---|---|---|
| 2002/0094817 A1* | 7/2002 | Rune et al. ............... | 455/450 |
| 2005/0239478 A1* | 10/2005 | Spirito .................... | 455/456.1 |
| 2006/0217112 A1* | 9/2006 | Mo ........................... | 455/422.1 |
| 2006/0258358 A1* | 11/2006 | Kallio ..................... | 455/437 |
| 2007/0232321 A1* | 10/2007 | Casati et al. ............ | 455/456.1 |

FOREIGN PATENT DOCUMENTS

| | | | |
|---|---|---|---|
| FR | EP2034791 | * | 6/2007 |
| JP | A 2004-357041 | | 12/2004 |
| WO | WO 02/03718 A2 | | 1/2002 |

* cited by examiner

Primary Examiner — Nizar Sivji

(57) ABSTRACT

The invention provides a method of enabling the service level networks (e.g. CSoLTE or IMS CN) to provide location-dependent services based on a circuit switched domain from a service level network to a mobile station communicating with a cell in a radio access network that utilises a packet switched domain. The method includes providing cell location information relating to the location of the cell; determining a Service Area Identifier based on the cell location information; and providing the Service Area Identifier to the service level network. The Service Area Identifier is then used for different location based services and applications in the service level network nodes.

14 Claims, 5 Drawing Sheets

SERVICE AREAS IN CS DOMAIN SERVICES

TECHNICAL FIELD

The present invention relates to the identification of Service Areas in the Service level networks that are accessed by mobile stations communicating with a packet switched cell in a cellular packet switched radio access network.

BACKGROUND

Mobile Circuit Switched (CS) services based on GSM and WCDMA radio access are a world-wide success story. They have allowed telecommunication services to be provided to subscribers in almost all countries of the world with a single subscription. Also today, the number of subscribers to networks that provide CS services is still growing rapidly, boosted by the rollout of mobile CS services in dense population countries such as India and China. This success story has been further extended by the evolution of the classical mobile switching centre (MSC) architecture into a softswitch solution.

However, the amount of data traffic on mobile networks could surpass that of today's broadband connections in the next decade. The Third Generation Project Partnership (3GPP) includes a work item "Evolved UTRA and UTRAN" that includes development of a radio access technology to support anticipated growth in mobile networks. This has been given the name Long Term Evolution of Universal Terrestrial Radio Access Network (UTRAN)—or LTE for short. LTE will use OFDM radio technology in the downlink and SC-FDMA for the uplink, allowing at least 100 Mbps peak data rate for downlink data rate and 50 Mbps for uplink data rate. LTE radio access can operate in different frequency bands and is therefore very flexible for deployment in different regions of the world.

Whereas LTE development focuses on the evolution of the 3G Radio Access Network (RAN), 3GPP also includes a System Architecture Evolution (SAE) work item to develop an evolved core network (CN). This new core network is also called Evolved Packet Core (EPC). Both the LTE RAN and the SAE core network only operate in a Packet Switched (PS) domain, i.e. all services are to be supported via this domain. To date, LTE/SAE can be considered to be service "agnostic". It does not care about the nature of the data. It has been assumed that services will be facilitated by a service level core network, and in particular by the IP Multimedia Subsystem (IMS).

It appears however that the assumption referred to in the preceding paragraph is not necessarily valid, due to the fact that some LTE/SAE network operators may not wish to implement an IMS network at all, or at least not simultaneously with LTE/SAE deployment. In this case, it becomes imperative that the SAE is able to handle or provide access to at least certain services, and in particular to the traditional CS type services referred to hereafter as legacy CS services.

LTE and SAE are being specified without fully accounting for co-existence with legacy CS services. Existing GSM and UMTS networks provide both PS and CS access simultaneously, and a problem arose in how to provide CS based services in the LTE access networks, particularly where such services have already become well established. Various solutions to this problem have been devised that enable use of LTE/SAE as access technology to the existing infrastructure so that services can be provided using both PS and CS access. These solutions are called "CS over LTE" (CSoLTE) and a preferred basic architecture for these solutions will be described below in relation to embodiments of the invention. Both the IMS CN and the CSoLTE solutions are described in this application as service level networks meaning that the communication towards the terminal and the 3GPP networks is based on the (S)Gi interface and IP (Internet Protocol) based communication.

One requirement for location based services and applications in the existing and new CS and PS core networks and in the service level networks is that the location of the user terminal or mobile station (MS) must be identified on different levels. Two such mechanisms are the Service Area Identifier (SAI) and Cell Global Identity (CGI) which are both used by the RAN to indicate the location of the MS to the CN and then used by the location based services and applications in both the CS and PS parts of the core network. SAI is used to indicate the current Service Area (SA) in which the user terminal or mobile station (MS) is located and the CGI is used to indicate the current cell where the MS is located. The differences between SAs and cells are summarised below and described in more detail later on.

The SA is a concept introduced in the 3GPP standards as part of the standardisation of the UMTS and UTRAN networks. Before this the GSM network used instead the Cell Global Identity (CGI) for similar purposes.

It was decided as part of the UMTS and UTRAN standardisation work in 3GPP that the cell identities are a radio access network (RAN) concept and should not be visible in the CN or communicated from the RAN to the CN. For this purpose the concept of a Service Area was introduced. However, in UMTS networks, the SAI is not known to the MS as only the cell identity is broadcasted in the system information and then mapped to a SAI in the Radio Network Controller (RNC) before being indicated to the CN. The location based services and applications in the UMTS CN are based on usage of SAI to define geographical information.

As the current SA is not known to the MS or to the service level network (e.g. IMS CN or CSoLTE solution), there are problems in providing location based services and applications in these service level networks. In particular, the way that the LTE radio access network and SAE core network communications are configured means that there is no way currently for the RAN (e.g. an eNodeB in LTE or RNC in UTRAN) to provide the current SA of the terminal to the new service level network.

It is an aim of the present invention to alleviate this problem.

SUMMARY

According to a first aspect of the present invention there is provided a method of facilitating the provision of circuit-switched Service Area-dependent services to a mobile station from a service level network, the mobile station communicating with a cell of a cellular packet switched access domain, the method comprising:
  providing cell location information for said cell;
  determining a Service Area Identifier using the cell location information; and
  providing the Service Area Identifier to said service level network.

In embodiments of the invention the cell location information is provided to a Mobile Management Entity, the Mobile Management Entity determining the Service Area Identifier and providing the Service Area Identifier to a Packet Mobile Switching Centre.

In other embodiments, the Service Area Identifier is determined using the cell location information in the packet switched access domain, and the Service Area Identifier is sent to the mobile station, the mobile station sending the Service Area Identifier to the service level network.

Embodiments of the invention have the advantage that Service Area dependent services can be provided from service level networks to mobile stations communicating with a packet switched cell in a cellular packet switched radio access network. Accordingly, existing CS-type location dependant services requiring SAs can continue to be provided in new or existing packet switched access domains such as LTE/SAE.

The mobile station may send a request for provision of the Service Area Indentifier, the request comprising said location information.

The cell location information may comprise a cell identifier of said cell. The cell location information may further comprise a Tracking Area within which said mobile station is located. When a mobile station registers or roams into a new Tracking Area, such that the Tracking Area is updated, the message may be sent from the mobile so as to update the Service Area.

In embodiments of the invention, the Service Area Identifier is determined in a translation function entity. Preferably, the translation function entity is a node in said service level network. The translation function entity may be integrated into a Mobile Switching Centre. The translation function entity may be integrated into a Mobile Management Entity.

Preferably, the Service Area Identifier is determined from data stored in a memory of the translation function entity. More preferably, the Service Area Identifier is determined from data stored as a look-up table in which input parameters comprise the cell location information.

In embodiments of the invention, the Service Area Identifier is determined in a radio network controller of a Universal Terrestrial Radio Access Network.

In embodiments of the invention the service level network comprises the IMS core network.

In embodiments of the invention, the location information is provided to a node of the service level network from another node. The other node may be a Policy Control and Charging Rules Function.

The method may further comprise the steps of providing Service Area dependent services over the packet switched domain using the Service Area Identifier.

According to a second aspect of the present invention there is provided a network node for facilitating the provision of circuit-switched Service Area-dependent services to a mobile station from a service level network, the mobile station communicating with a cell of a cellular packet switched access domain, the network node comprising:
  means for receiving cell location information for said cell;
  means for determining a Service Area Identifier using the cell location information; and
  means for providing the Service Area Identifier to said service level network.

According to a third aspect of the present invention there is provided a translation function entity within a service level network that provides services to a mobile station communicating with a cell of a cellular packet switched access domain, the translation function entity comprising means for determining a Service Area Identifier using location information of said cell so as to enable the provision of Service Area-dependent services to the mobile station.

The translation function entity may be a Mobility Management Entity in a Packet Mobile Switching Centre.

According to a fourth aspect of the present invention there is provided a mobile device configured for communication in a cellular packet switched access domain, the mobile device being configured to transmit a message to the network requesting identification of a Service Area based on the location of the mobile device for enabling the provision of Service Area dependent services, wherein the message comprises cell location information relating to a cell with which the mobile device is communicating.

The location information may comprise a cell identifier and a Tracking Area. The mobile device may be configured to transmit said message each time the Tracking Area is updated.

DETAILED DESCRIPTION

Embodiments of the invention are described in relation to LTE radio access networks and SAE core networks although the principles may be applied to other similar networks that may employ PS access that is used to access service level networks, such as UTRAN (Universal Terrestrial RAN) and UMTS CN used to access the IMS CN.

Figure 1:
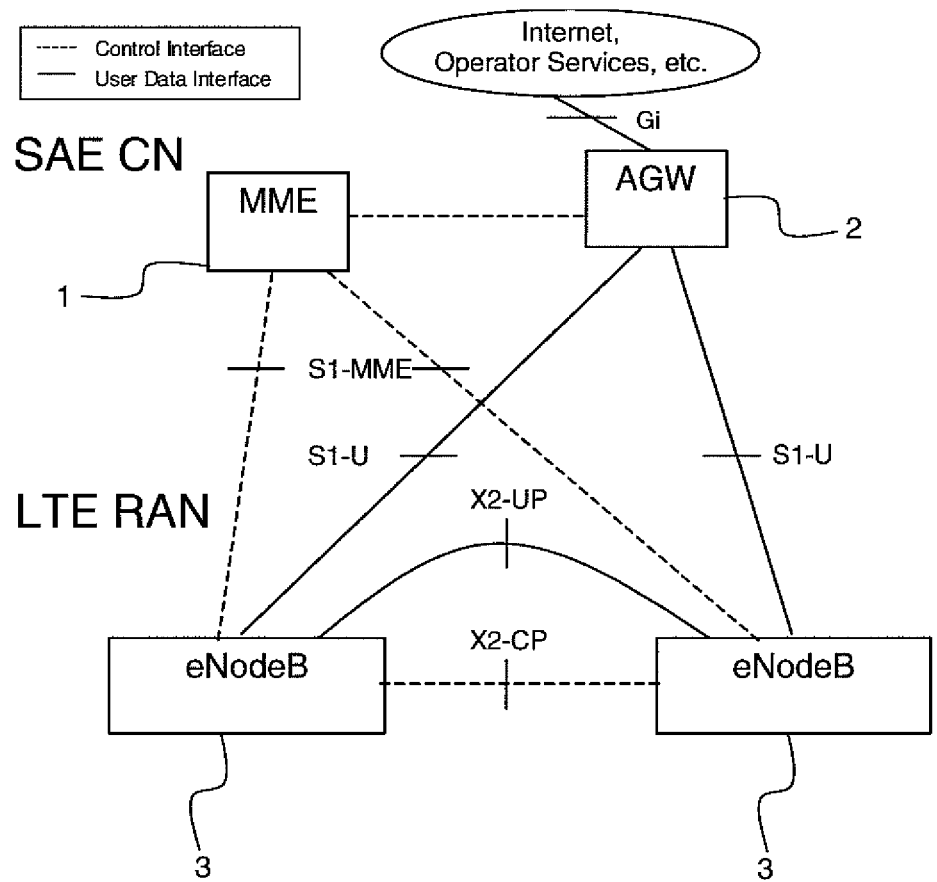
FIG. 1 is a schematic illustration of the LTE and SAE core network.

FIG. 1 illustrates schematically the LTE radio access network and the SAE core network. The SAE is made up of core nodes, which, at least in one proposal, are further split into Control Plane and User Plane nodes. The LTE RAN is comprised of a network of nodes 3 each referred to as E-UTRAN Node B (eNodeB), with which the mobile station (MS) devices communicate. Control data is passed between the eNodeBs 3 via the X2-CP interface, while user data is passed via the X2-UP interface. In the SAE core network, the Control Plane nodes include a Mobile Management Entity (MME) node 1, while the User Plane consists of Gateway nodes 2 (Serving Gateway and PDN Gateway), through which the user data is directed. In this application, the term Access Gateway (AGW) is used to depict both the Serving Gateway and the PDN Gateway nodes and functions. The MME 1 is connected to the eNodeB via the S1-MME interface and the AGW 2 is connected to the eNodeB via the S1-U interface. The AGW 2 may contain both User Plane Entity (UPE) and Inter-Access Anchor (IASA) functionality.

Figure 2:
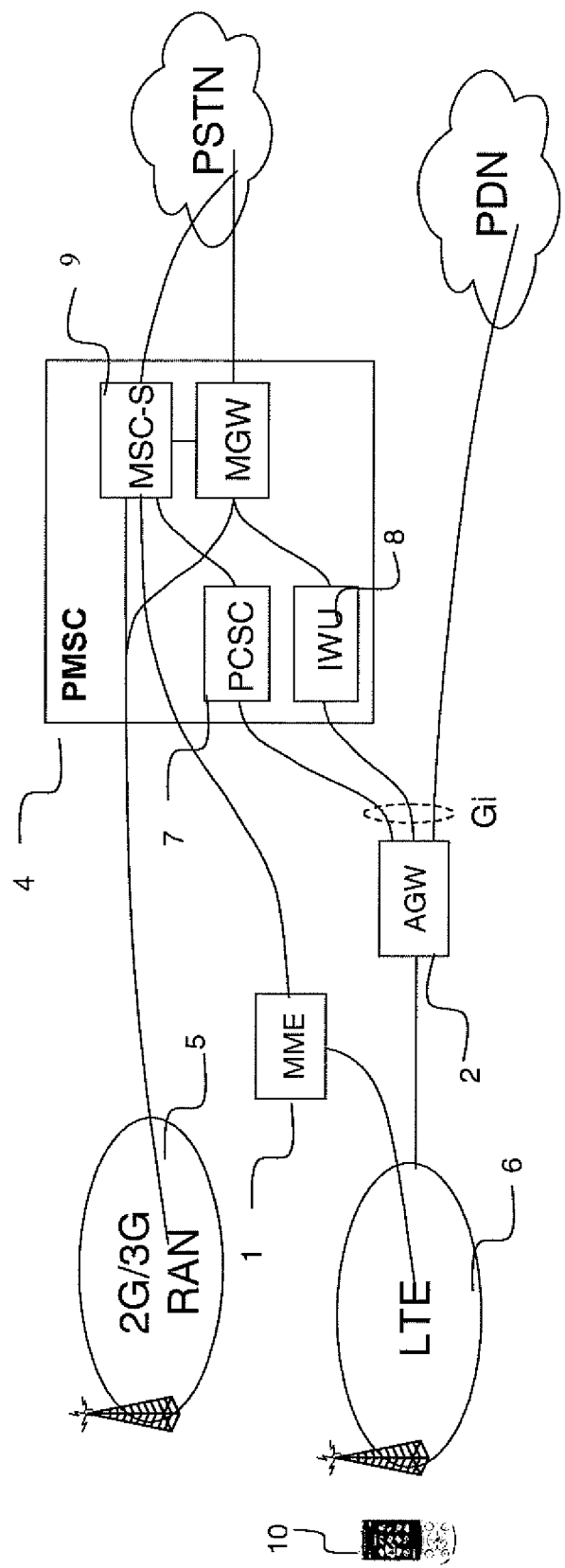
FIG. 2 is a schematic illustration of a basic architecture that is used to provide CS over LTE radio access.
Figure 3:
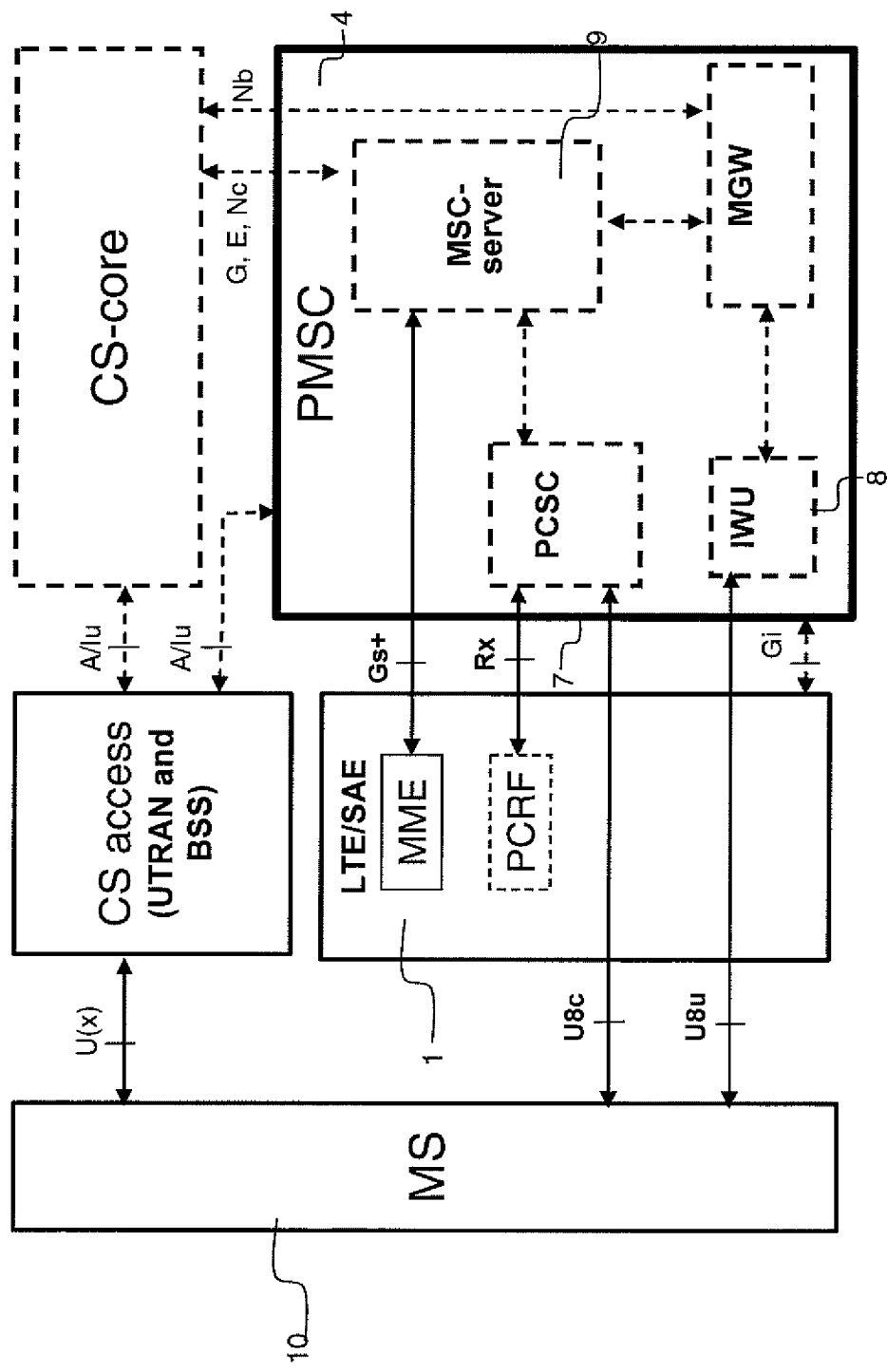
FIG. 3 is a more detailed schematic illustration of the principal components and interfaces in the architecture of FIG. 2.

Referring to FIG. 2, a basic architecture that is used to provide CS over LTE radio access network includes a Packet MSC (PMSC) 4 as the main service level network node, which can be serving both traditional 2G and 3G RANs 5 as well as the new CS over LTE via the MME 1 and AGW 2. There are three different alternatives for the CSoLTE solutions and the descriptions below indicate how the SAE CN nodes are used for these alternatives. The PMSC 4 includes a Mobile Switching Centre Server (MSC-S) 9 as well as a Media Gateway (MGW) in common with conventional Mobile Switching Centres serving 2G/3G RANs. The PMSC 4 contains two new logical functions: a Packet CS Controller (PCSC) 7 and an Interworking Unit (IWU) 8 that are further described below in relation to FIG. 3.

The communication between a user terminal, or mobile station, 10 and the PMSC 4 is based on the standard Gi interface which is also called as a SGi interface in the SAE terminology. This means that all direct communication between the user terminal 10, the PCSC 7 and the IWU 8 in the PMSC 4 is based on IP (Internet Protocol) based protocols and that the user terminal 10 is visible and reachable using an IP-address via the AGW 2. This communication is divided into two different interfaces, U8c for the control plane and U8u for the user plane. The U8c interface is between the terminal 10 and the PCSC 7 and the U8u interface is between the terminal 10 and the IWU 8. The PCSC 7 also has an Rx interface to a Policy Control and Charging Rules Function PCRF, which controls allocation of LTE/SAE bearers (i.e. PS bearers) to the mobile stations 10. An additional important detail for this application is that there is currently no way for the LTE RAN to communicate the current SA of the terminal to the PMSC 4.

The three different solutions for providing CS over LTE services are summarised below.

The first solution is called "CS Fallback". In this solution, the user terminal 10 performs SAE Mobile Management (MM) procedures towards the MME 1 while camping on LTE access. The MME 1 registers the terminal in the MSC-S 9 for CS based services. When, as part of a CS based service, data is to be provided to the user terminal using the CS domain, a page for CS services is received in the MSC-S 9 and is forwarded to the user terminal 10 via the MME 1. The user terminal 10 then falls back to the 2G or 3G RANs 5 for provision of the CS based service. In other words, the CS-based service data is provided to the user terminal 10 using the conventional 2G or 3G radio access, instead of via the LTE radio access. Similar behaviour applies for Mobile originated CS services. When the user terminal 10 is camping on LTE access, it will fall back to the 2G or 3G RANs 5 and trigger the initiation of the CS based service via the conventional 2G or 3G radio access instead of the LTE radio access.

The second solution is called CS over LTE Integrated (CSoLTE-I). In this solution the same SAE MM procedures as described above for "CS Fallback" are used, but instead of falling back to the 2G or 3G RANs 5, all the CS services are provided over the LTE access. This means that the CS services (also called Connection Management, CM, procedures) are transported over IP-based protocols between the PMSC 4 and the user terminal 10 using the LTE access and the SAE nodes like AGW.

The third solution is called CS over LTE Decoupled (CSoLTE-D). In this case both MM and CM procedures are transported over IP-based protocols directly between the PMSC 4 and the user terminal 10 using the LTE access and the SAE user plane nodes like the AGW.

Figure 4:
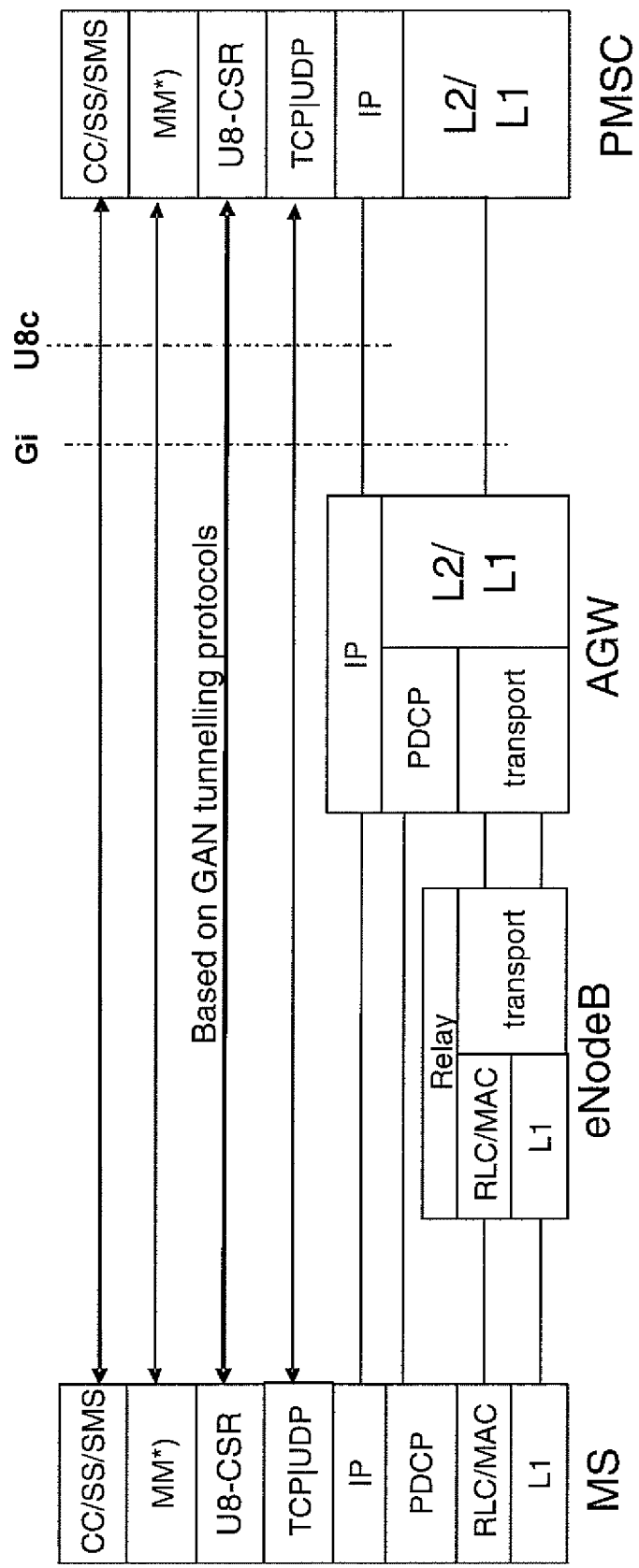
FIG. 4 is a signalling diagram illustrating the control signalling in the architecture of FIGS. 2 and 3.

The control plane protocol architecture that applies for the CSoLTE-I and CSoLTE-D solutions described above, between the user terminal 10 and the PMSC 4 (i.e. the U8c interface) is shown in FIG. 4.

A consideration of the above-described solutions relates to the differences between the way that MM area concepts are handled in legacy CS networks and in LTE radio access networks and in SAE core networks. In legacy CS networks, a geographical area is covered by Location Areas (LAs), each of which is controlled by one MSC or by one MSC pool. Each LA is further divided into 2G/3G cells. Each cell is managed and controlled by Radio Network Controllers RNCs in the 3G RAN (UTRAN) or by Base Stations BSCs in the 2G RAN (GERAN). The main location area used for MM is the LA and is identified with a Location Area Identity LAI. The LTE radio access network and SAE core network use a different MM area concept format for specifying position information, which includes specifying Tracking Area identities TAI and LTE cell identities. The MME 1 (see FIG. 1) controls and manages the eNodeBs 3 of the LTE cells and the tracking areas (TAs). Each TA is handled and controlled by the MME 1. Tracking Areas may not cover just one Location Area (LA). Hence, there is no one-to-one correspondence between LAs and TAs. In the above-described solutions a transformation is performed between the two formats.

Additionally, there is a fundamental difference in how information about the current SA, LA, TA or cell can be informed from a RAN to the CN compared with the case where the RAN is controlled by the CN and directly connected to it. In the CSoLTE case, the service level network nodes are the nodes needing the above information, mostly the SA information, and there is currently no way to communicate this information from the RAN to the service level network nodes (e.g. the PMSC or any of CSCF-nodes in a IMS network).

However, a further consideration for the provision of certain location based services and applications in the service level network derives from the use of Service Areas. A Service Area (SA) is a geographical area and legacy CS based services use the concept of a SA in the provision of a certain location dependent services. Examples of such services are the routing of emergency calls to the closest emergency call center or to route a call to the closest taxi company. As previously mentioned, the RAN provides the location of the MS to the CN using both the Service Area Identifier (SAI) and Cell Global Identity (CGI). This information is then used by the location-based services and applications in both the CS and PS parts of the core network. SAI is used to indicate the current Service Area (SA) in which the MS is located and the CGI is used to indicate the current cell where the MS is located.

The cell identity of each cell is broadcasted in GSM as part of the cell specific system information that is received and can be interpreted by all mobile stations camped on that cell. The cell identity identifies uniquely a GSM cell and as each cell has limited coverage and relates to a geographical location, the GSM cell identity (i.e. the CGI) also provides information about the location. In GERAN a base station controller (BSC) informs the MSC and a Serving GPRS Support Node (SGSN) of the current cell identity of the MS. The mechanisms to perform this vary depending on whether the MSC is informed in the CS domain or if the SGSN is informed in the PS domain. However, these differences between CS and PS domains in providing the CN with cell identity information are not relevant for the present invention. For example, the MSC is informed about the current cell identity each time a signalling connection is established between the MS and the MSC. This means that the different location based services and applications in the MSC and in the SGSN and beyond the MSC and the SGSN may use this cell identity to retrieve MS location information.

It was decided as part of the UMTS and UTRAN standardisation work in 3GPP that the cell identities are a radio access network (RAN) concept and should not be visible in the CN or communicated over the Iu-interface from the RAN to the CN. For this purpose the concept of a Service Area was introduced. This means that each cell in UTRAN has two different identifiers. First there is the cell identity that is broadcasted as part of the cell specific system information and which is visible to the mobile stations. When the RNC in the UTRAN is supposed to inform the CN (i.e. MSC or SGSN) about the current location of the MS, the decision to not have cell identities visible in the CN means that it is not permitted to send the cell identity to the CN. Instead the SA is to be indicated to the CN. As mentioned previously, the SA is defined by a Service Area Identifier (SAI) and is maintained in the UTRAN (i.e. in the RNC) by the operator with O&M activities. This means that each cell has a SAI in addition to the cell identity and when the MS location is to be indicated to the CN, the current cell identity of the MS is known to the RNC and is used to retrieve the corresponding SAI, which is then provided to the CN. So the main difference between GSM and UMTS networks in this respect is the type of location information indicated from the RAN to the CN. In GSM, the CGI is used and in UMTS the SAI is used. This further means that in UMTS networks, the MS does not know the SAI because only the cell identity is broadcasted in the system information. The cell identity is mapped to a SAI in the RNC before being indicated to the CN. Accordingly, the location based services and applications in the UMTS CN are based on the use of SAI to define geographical information.

The SAI consists of the PLMN-Id, the Location Area Code (LAC) and a Service Area Code (SAC). PLMN-Id consists of Mobile Country Code (MCC) and Mobile Network Code (MNC). As Location Area Identifier (LAI) consists of PLMN-Id and LAC, this means that the Service Area is a sub-structure of the LA.

The CGI consists of the PLMN-Id, the Location Area Code (LAC) and a Cell Identity (CI). PLMN-Id consists of Mobile Country Code (MCC) and Mobile Network Code (MNC). This also means that the CGI is a sub-structure of the LA.

Although the handling of Service Areas has not yet been agreed in LTE/SAE standardisations, it is likely that the same principles that applied in UMTS/UTRAN networks will be selected.

As neither the MS nor the service level network knows the current SA, there are problems to provide the location based services and applications, for example, with the CSoLTE solutions described above. It is clear that most of the functionality of the MSC-S 9 should be reused. The MSC-S is handling the location-based services and applications based on the SAI as provided from the 2G and 3G RANs 5. However, in the case of the CSoLTE solutions the communication between the MS 10 and the PMSC 4 is based on the Gi (SGi) interface meaning there is no way for the RAN to indicate the current SA to the PMSC 4. The PMSC 4 is illustrated using the PCSC function and a separate MSC-S 9. As it is considered as important that the MSC-S 9 should not need to be modified to support the CSoLTE applications, it is clear that the PCSC needs to be connected to the MSC-S 9 using an existing RAN-CN interface, e.g. the A interface used between a BSC and the MSC or the Iu-cs interface used between an RNC and the MSC. Even so, the main problem is that the PCSC is not aware of the current SA when this information is available e.g. in the LTE RAN. Exactly the same problem arises, for example, if location based services and applications are to be introduced in an IMS CN and the MS is using IMS services from UTRAN or LTE radio access networks.

To overcome this problem, embodiments of the present invention provide a way for the MS to request the current SAI from the current RAN (e.g. UTRAN or LTE RAN) and then be able to communicate this towards the service level network node (e.g. PMSC or IMS CN) needing this information. The Service Area is provided to the MS, and is derived from the TA and cell identity in the case of LTE RAN. In the case of UTRAN being used, the SA information is already configured in the RNC and can be returned to the MS based on the current cell the MS is camped on (as the RNC knows which cell the MS is in). For example, the MS may then be able to initiate a request for provisioning of some location based services or applications by including the SA in the request.

Additionally, in the third solution (CSoLTE-D) mentioned above, call set-ups and location update signalling need to include the identity of the SA. This means that when the MS initiates such requests towards the PCSC over the U8u-interface, it includes e.g. the identity of the current SA (i.e. the SAI) in the request sent to the PCSC. The PCSC is also then able to provide this information to the MSC-S and the existing location based services and applications in the MSC-S can be reused.

Embodiments of the present invention therefore provide a means for identifying the SA in which a MS is located, when the MS is using a PS radio access network to access the services provided by a service level network (e.g. CSoLTE). The embodiments are described in relation to, but should not be seen as limited to, LTE radio access networks.

In embodiments of the invention, location information is provided to a (P)MSC over the Gs+ interface (see FIG. 3) for the CS Fallback and CSoLTE-I solutions. The location information is the SA. In this embodiment, the SA is produced by the MME 1. Stored in the memory of the MME 1 is a look-up table where the current Tracking Area (TA) and/or LTE cell identifier are input parameters, and the output is an SA. When a MS registers, or when it roams into a new TA, such that the TA is updated, the MME will translate the TA and cell identifier to the appropriate SA, and then use that for Location Update procedures towards the PMSC, or more precisely towards the MSC-S component of the PMSC.

In an alternative embodiment, the translation function would reside in the radio network controller (RNC) in the Universal Terrestrial RAN (UTRAN) and the MS would be able to request the RNC to return the current SAI.

In another embodiment, the translation function is an entity, for example residing as a node in the service level network or as a database node accessible via the (S)Gi interface.

In another embodiment, the translation function is integrated into the PMSC 4. In this case, the MME 1 provides the TA and cell id to the PMSC 4 over the Gs+ interface, and the SA is retrieved in the PMSC using the translation function.

Figure 5:
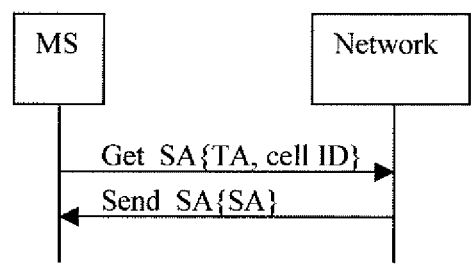
FIG. 5 is a signalling diagram illustrating signalling employed in embodiments of the invention.

As mentioned above, there are situations where the MS 10 needs to obtain the SA. Embodiments of the invention provide for the SA to be provided in response to a request signal. FIG. 5 illustrates the signal flows between the MS 10 and the network. These include the sending of a request from the MS 10 to the network. The network responds by sending the SA, as determined by the MME 1, or other entity in the network as described above. The request from the MS 10 may include the TA and the cell identifier, where the network does not already hold these.

The MS 10 can use the SA for any location based service or application in the service level network that may need it for location dependent services. This means that these service applications are provided with a uniform format of the SA in which the MS is located.

The description above has focused on the provision of SAs, which are provided for UMTS (UTRAN) and LTE radio access networks. For other networks such as GSM (GERAN), the Service Area corresponds to the Global Cell ID, which would then be provided from the MS to the service level network. The main difference here is that the MS doesn't normally need to request the network about the current cell identifier (as is shown in FIG. 5 for the SAI) as this information is known to the MS from e.g. the broadcasted system information. SA and Global Cell ID have the same format.

The embodiments described so far are based on the service level network trusting the SAI information it receives from the MS. In the case that this information can not be trusted, embodiments of the invention include another new way to provide the information about the current SA to the service level network that functions as follows for the case of the LTE RAN and SAE CN.

The LTE RAN (i.e. the eNodeB) informs the MME about the current SAI for the bearers reserved for the different MSes. The MME communicates this information to the PCRF via the AGW node(s). Once the PCRF receives this information, it can use the Rx-interface to inform an Application Function (AF) about the current SAI and the AF can use the SAI for the location based services and applications. In the case of CSoLTE, the AF is the PCSC function.

However, the AF normally needs the SAI information as part of the initial request, whereas the SAI information would normally have been provided by the PCRF once the required PS bearers had been allocated for the MS. Therefore, for the new approach to function properly the current SAI of the MS is informed to the PCRF all the time for the default SAE bearer that the MS holds whenever it is attached to the LTE RAN and SAE CN. This means that the AF can ask the PCRF for the current SAI at the initial request. The SAI information can then be forwarded to the MSC-S part of the PMSC.

The invention claimed is:

1. A method of facilitating the provision of circuit-switched Service Area-dependent services to a mobile station from a service level network that requires a Service Area Identifier (SAI) to provide the Service Area-dependent services to the mobile station, the mobile station communicating with a cell of a cellular Packet Switched (PS) access domain that does not initially provide the SAI to the service level network, the method comprising:
   from the PS access domain, initially providing only a Cell Global Identity (CGI) for said cell to the mobile station without providing the SAI to said mobile station, wherein the SAI is different from the CGI but can be determined from the CGI;
   determining the SAI from the CGI using one of the following approaches:
      converting the CGI into the SAI using a Mobility Management Entity (MME),
      translating the CGI into the SAI using a translation function entity in the service level network, and
      converting the CGI into the SAI using a Mobile Switching Centre;
   sending the SAI to the mobile station in response to receiving a request therefor from the mobile station, wherein the request comprises the CGI but not the SAI; and
   providing the determined SAI to said service level network so as to facilitate provision of circuit-switched Service Area-dependent services to the mobile station despite initial non-provision of the SAI to the mobile station as well as the service level network.

2. The method of claim 1 wherein the step of determining the SAI includes the step of MME providing the Service Area Identifier to a Packet Mobile Switching Centre.

3. The method of claim 1 wherein the step of providing the determined SAI to the service level network includes the step of the mobile station sending the Service Area Identifier to the service level network.

4. The method of claim 1 wherein the step of determining the SAI further comprises the step of determining the SAI from a Tracking Area within which said mobile station is located.

5. The method of claim 1 wherein the Service Area Identifier is determined from data stored in a memory of the translation function entity.

6. The method of claim 1 wherein the Service Area Identifier is determined from data stored as a look-up table in which input parameters comprise the CGl.

7. The method of claim 3 wherein the Service Area Identifier is determined in a radio network controller of a Universal Terrestrial Radio Access Network in response to receiving the request from the mobile station.

8. The method of claim 1 wherein the service level network comprises the IMS core network.

9. The method of claim 1 wherein the SAI is provided to a node of the service level network from another node.

10. The method of claim 9 wherein the other node is a Policy Control and Charging Rules Function.

11. The method of claim 1, further comprising the step of providing Service Area dependent services over the PS domain using the Service Area Identifier.

12. A mobile device configured for communication in a cellular Packet Switched (PS) access domain, the mobile device being configured to perform the following:
   initially receive only a Cell Global Identity (CGI) for a cell of the PS access domain with which the mobile device is currently communicating, wherein the mobile device does not receive a Service Area Identifier (SAI) from the PS access domain as part of the initial reception of the CGI, and wherein the SAI is different from the CGI but can be determined from the CGI;
   transmit a message to the PS access domain requesting the SAI based on the location of the mobile device for enabling the provision of Service Area dependent services to the mobile device from a service level network that requires the SAI to provide the Service Area-dependent services, wherein the service level network also does not initially receive the SAI from the PS access domain, and wherein the message from the mobile device comprises the CGI but not the SAI, and wherein receipt of the CGI enables the PS access domain to determine the SAI using one of the following approaches:
      convert the CGI into the SAI using a Mobility Management Entity (MME),
      translate the CGI into the SAI using a translation function entity in the service level network, and
      convert the CGI into the SAI using a Mobile Switching Centre; and receive at the mobile device, the SAI from the PS access domain.

13. The mobile device of claim 12 wherein the message transmitted from the mobile device also comprises a Tracking Area.

14. The mobile device of claim 13, configured to transmit said message each time the Tracking Area is updated.

* * * * *